Nov. 15, 1932.          H. CASLER          1,887,992
                    BRAKE TESTING DEVICE
              Filed March 1, 1929       4 Sheets-Sheet 4
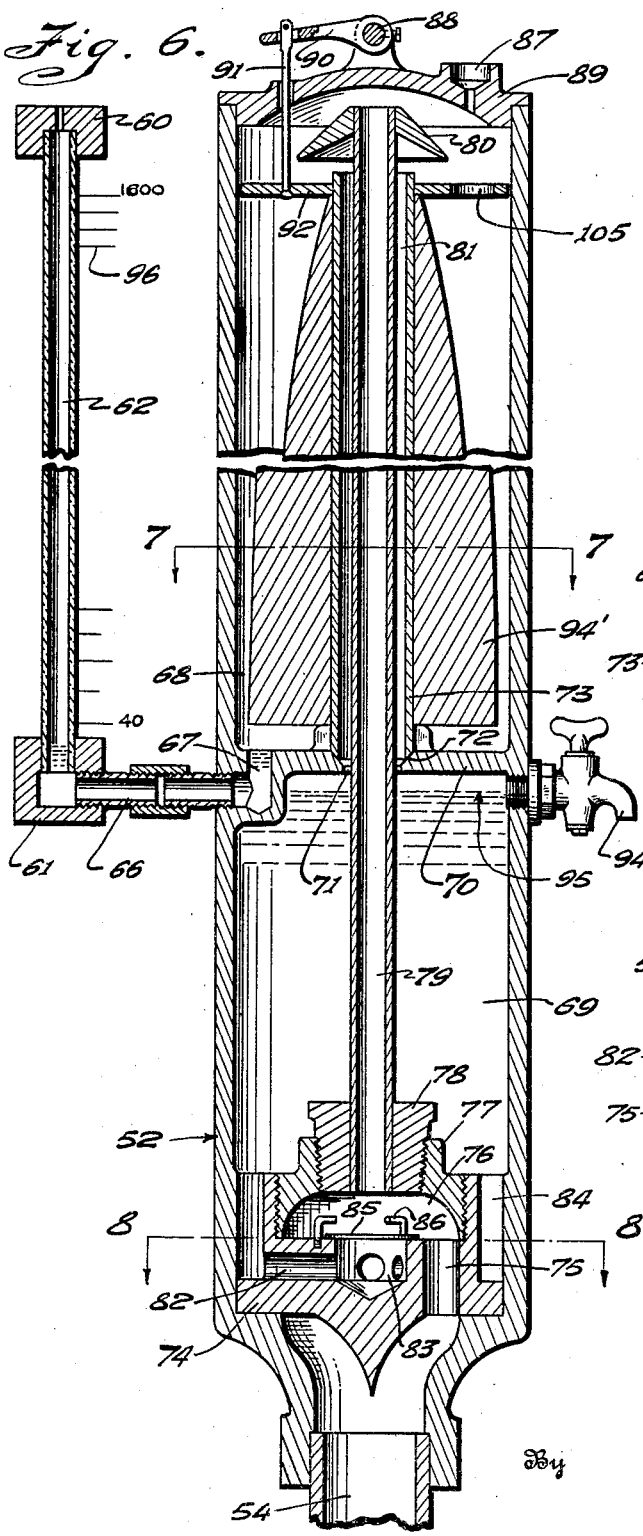
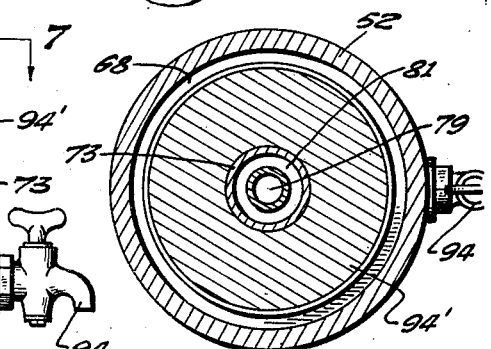
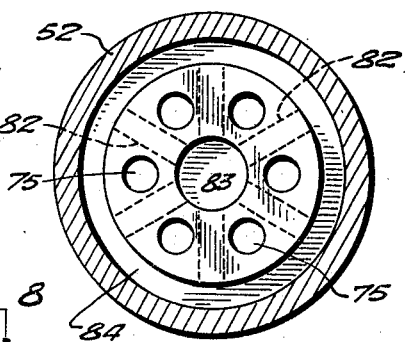
Inventor
Herman Casler Patented Nov. 15, 1932

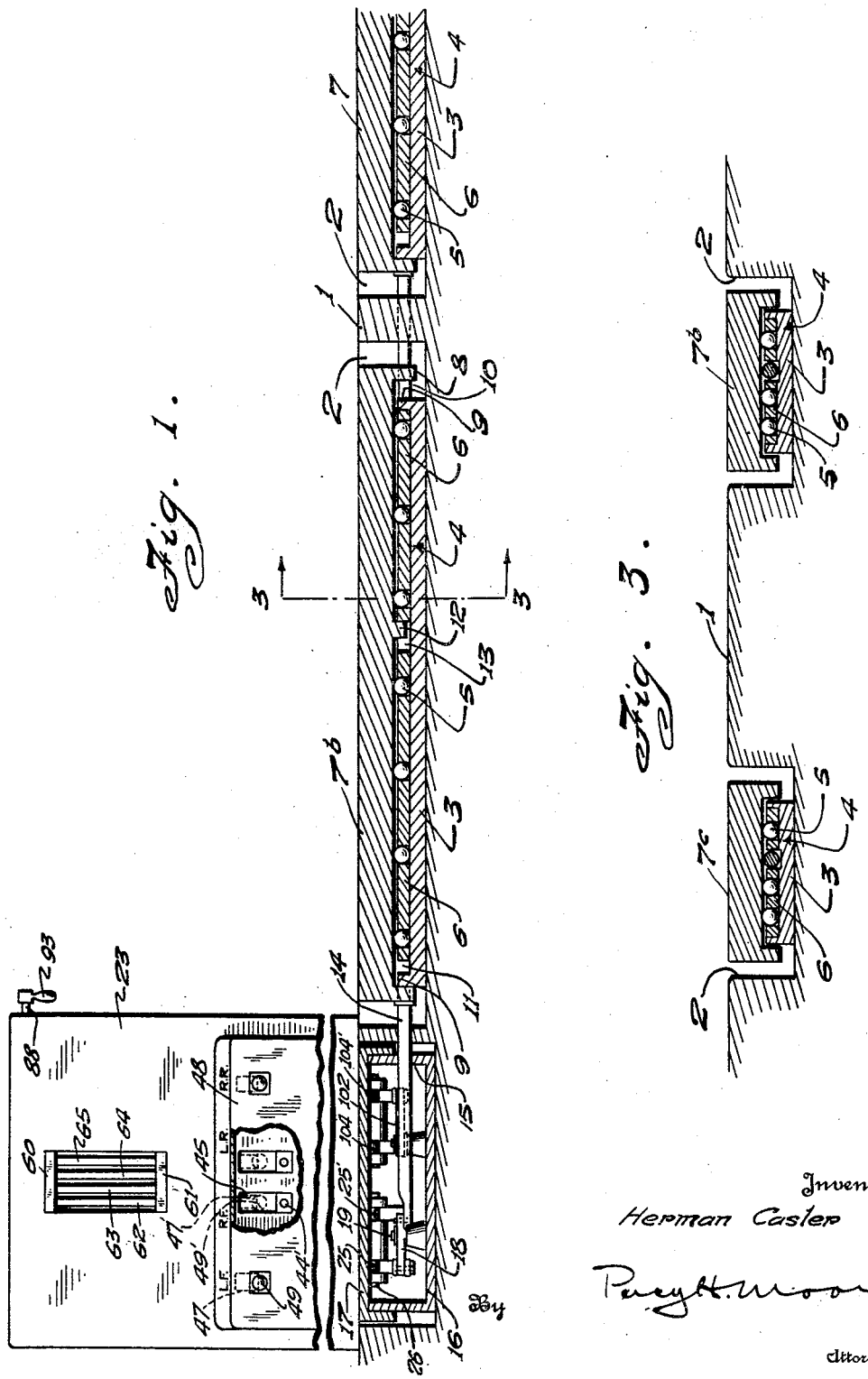

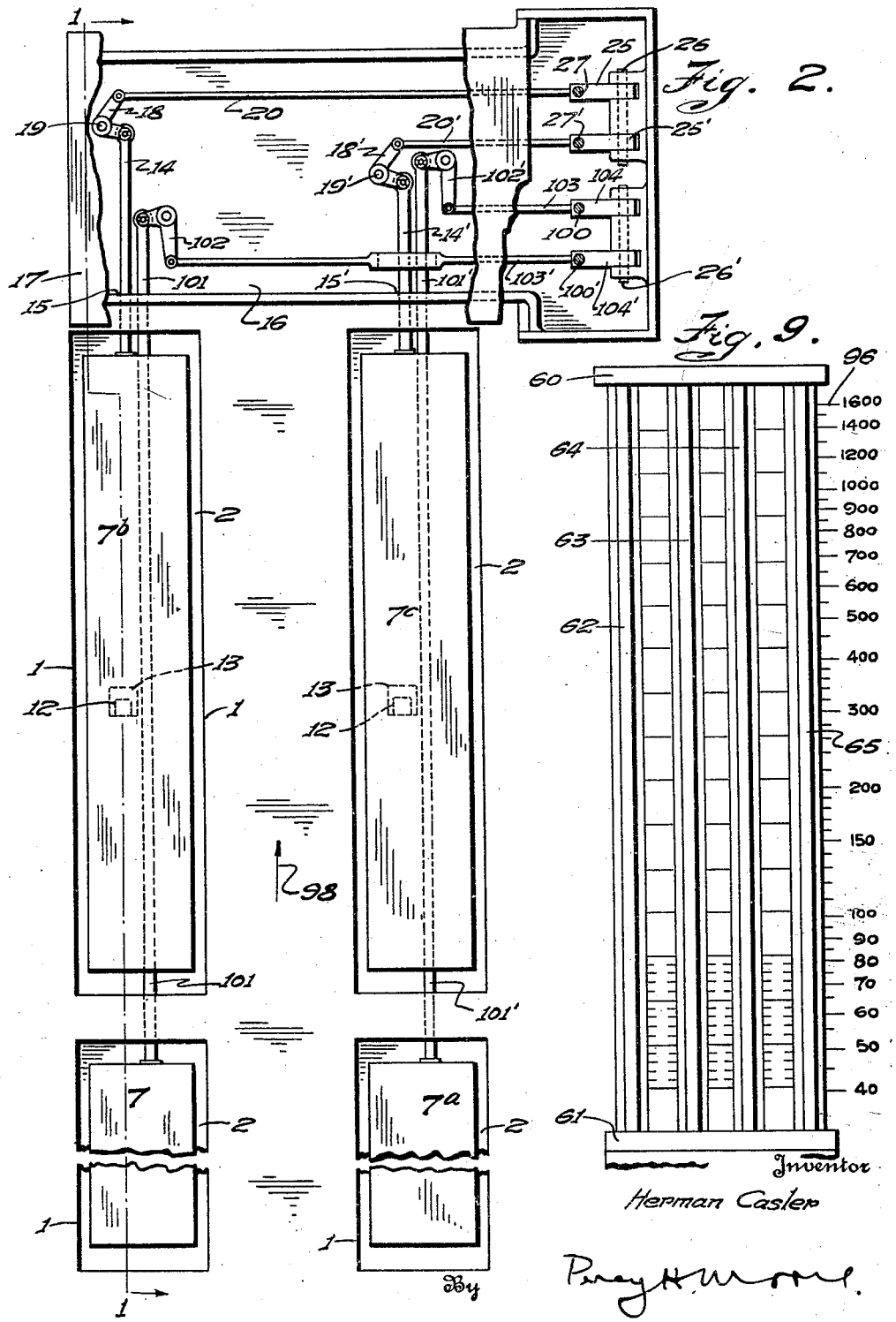

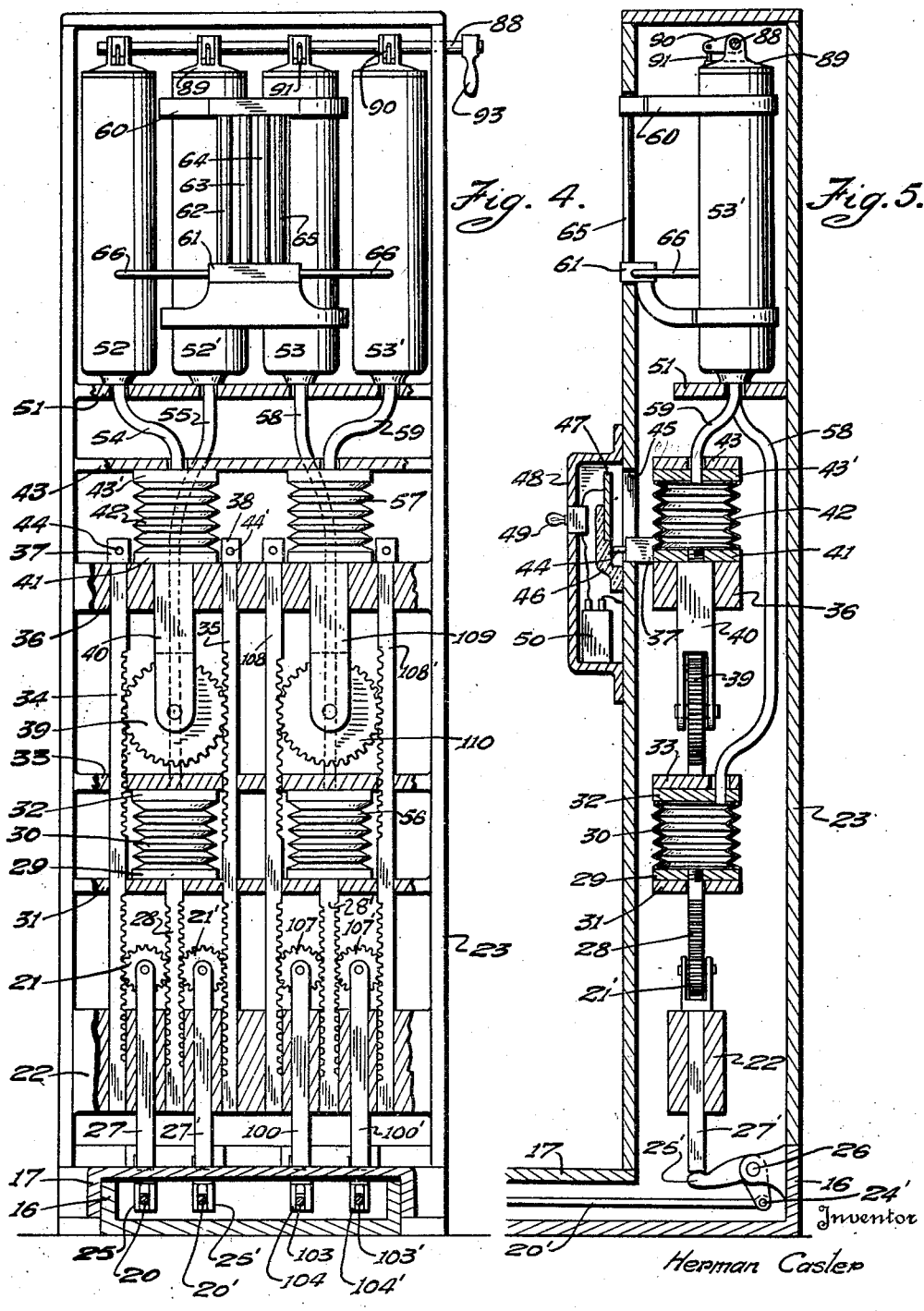

1,887,992

UNITED STATES PATENT OFFICE

HERMAN CASLER, OF CANASTOTA, NEW YORK

BRAKE TESTING DEVICE

Application filed March 1, 1929. Serial No. 343,633.

My invention relates to apparatus for testing motor vehicle brakes and has for its object to provide a device of this nature by means of which it will be possible without mental calculations to readily determine the relative individual braking effect of the front wheels, or of the rear wheels, or of the front wheels as compared to the rear wheels, to facilitate adjustment so that corresponding wheels can be caused to brake with equal effect and the combined rear wheels with somewhat more effect than the combined front wheels, according to common practice.

Another object of the invention is to provide a set of gauges by means of which the operator can readily determine without mental calculation, in terms of percentages, the relative braking effect of any two brakes or sets of brakes.

Another object of the invention is to provide a plurality of gauges, and means whereby one gauge will indicate the braking effect of the more effective front wheel; another gauge will indicate the braking effect of the two front wheels; another gauge will indicate the combined braking effect of the two rear wheels and the fourth will indicate the braking effect of the more effective rear wheel brake.

Another object of the invention is to provide means for prolonging the length of time the gauge is being acted upon by the retarding force whereby the average braking effect is indicated.

Heretofore, vehicle wheel brake testing devices have usually indicated the braking force in pounds for each wheel of the vehicle. With this method the operator is forced to go through a mental calculation to determine the relative values we will say, of the brakes on the two front wheels. As an illustration, if the braking effect is indicated by a gauge of the type used on boilers for indicating steam pressure, the graduated scale representing pressure is approximately uniformly graduated from zero to the maximum capacity of the gauge. Assuming that one front wheel would indicate one hundred pounds pressure or force and the other front wheel were to indicate two hundred pounds force or pressure we would have a difference in indicated pressure of one hundred pounds and by mental calculation would know that the more effective brake was one hundred percent greater than the less effective brake. Assuming again that in testing a vehicle that the gauge would indicate one thousand pounds force or pressure for one wheel and the other gauge would indicate a force or pressure of eleven hundred pounds for the other front wheel then we would have a difference between the two gauge readings of one hundred pounds the same as in the first instance, and by mental calculation the operator would know that the more effective brake was only ten percent greater than the less effective brake. It is therefore apparent that the position of the pointer of the steam gauges in each of the two tests would vary in position a distance comparable with a difference of one hundred pounds on the gauge scale. In other words if the difference in reading of one hundred pounds on the gauges were equal to one inch the operator could only visualize, at first glance, one inch difference in the location of pointers, but he cannot see except by mental calculation, that in the first instance the better brake is one hundred percent better than the weaker brake and in the second instance that the better brake is only ten percent better than the weaker brake.

According to my invention this objection is overcome by providing a novel construction of gauges wherein the linear distance between the reading points of any two gauges will remain constant, so long as the percentage of difference between any two sets of braking conditions is constant, irrespective of the magnitude of the retarding effect of the brakes.

Heretofore devices of this character have only indicated the high spots in the braking effect of the different brakes, that is where a brake drum is not concentric with the brake mechanism, during a portion of the revolution of the wheel the brake is more effective than it is during other portions of the revolution of the brake drum. Under such conditions the gauge usually indicates the maximum braking effect. According to my invention, this objection is overcome by allowing the retarding force of the brake to force a quantity of liquid through a restricted passage into the gauge during the time the brake is functioning, thereby including the elements of time and retarding force in the gauge reading. In this way the approximate average braking effect of each of the several brakes is secured.

Other objects and advantages of the invention will be apparent as the description is considered in connection with the accompanying drawings, in which:

Figure 1 is a sectional elevation taken on the line 1—1 of Figure 2;

Figure 2 is a plan view with parts removed;

Figure 3 is a section on the line 3—3 of Figure 1;

Figure 4 is an elevation of the indicating mechanism with front door removed;

Figure 5 is a sectional elevation of Figure 4;

Figure 6 is a detail section of the liquid tank and gauge indicating mechanism;

Figure 7 is a section on line 7—7 of Figure 6;

Figure 8 is a section on line 8—8 of Figure 6; and

Figure 9 is a front elevation of the gauges and the logarithmic scale.

Referring more particularly to the drawings wherein like reference numerals refer to corresponding parts throughout the several views 1 denotes the concrete floor of a garage or other building in which the device is installed. Preferably the mechanism of the device is located in a suitable recess or cavity 2 so that the top of the device will be flush with the top of the floor. However, if deemed desirable the device may be mounted directly upon the floor, in which case, inclined approaches or ramps (not shown) would be employed.

In the embodiment illustrated base plates 3, four in number, mounted in cavities 2, support ball bearing frames 4, each comprising a plurality of anti-friction ball bearings 5 held in spaced relation by plates 6. These ball bearings support movable top plates, 7, 7a, 7b and 7c, one for each ball bearing frame 4 and base plate 3, provided with side flanges 8 fitting over corresponding end flanges 9 formed upon the base plates. These plates are preferably the length of the wheel base of the maximum sized vehicle to be tested. It will be noted that the flanges 8 and 9 cooperate to prevent dirt from collecting on the bearings 5 between the movable plates and the base plates.

When the movable top plates are in normal or Figure 1 position there will be a space or clearance 10 between the respective rear end flanges 8 and 9 of the top plates and base plates 3, the purpose of which is to permit the top plates to move forwardly under the load of a vehicle. For a similar purpose a clearance or space 11 is provided between the forward ends of the roller bearing plates 6 and the forwardmost end flanges 9 of the base plates 3. A lug 12 depending from each top plate engages loosely within an opening 13 in the ball bearing plates 6, serves to keep the ball bearings and their plates in their normal or Figure 1 position, relatively to the base plate. Movement of the top plates with respect to the movement of the ball bearing frames will be at the ratio of 2 to 1, that is, when the top plates are carried forward a distance of two inches under the load of a vehicle, the ball bearings 5 and plates 6 will be moved in a corresponding direction a distance of one inch. In other words the ball bearing frames travel one half as far as the movable plates.

Connected to the forward ends of the foremost pair of movable top plates 7b and 7c are plungers 14—14' which project through bearings 15—15' into a box 16 provided with a cover 17. These plungers are loosely, pivotally connected to one arm of bell crank levers 18—18' pivotally mounted as at 19—19' in the box 16, the other arms of the bell cranks 18—18' being pivotally connected to connecting rods 20—20' which are pivotally connected respectively to bell crank levers 25—25', pivotally mounted in the box 16 as at 26.

As the construction and mounting of the rear movable platforms 7 and 7a and the gauge and gauge mechanism therefor is identical with that of the front movable platforms or plates 7b and 7c, detailed description of the former is deemed unnecessary.

The free ends of bell cranks 25—25' engage beneath the lower ends of vertically disposed plunger bars 27—27' which carry at their upper ends gears 21—21' respectively, it being noted that these plunger bars are mounted for reciprocable movement in the cross member 22 of the casing or frame 23. A rack bar 28 connected with the free end 29 of a bellows 30 loosely extends down through cross members 31 and 32 and is engaged at opposite sides by the gear 21—21', the fixed end 32 of the bellows 30 being attached to cross member 33. A pair of rectangular rack bars 34—35, for engagement with the gears 21—21', depend from cross member 36 and extend loosely down through said member 36 and cross members 33, 31 and 22, the rack bars being provided with enlarged portions or heads 37 and 38 for their support on member 36. Coacting with bars 34 and 35 is gear 39 which is supported and carried by the lower end of a square bar 40, the upper end of which extends through the cross member 36 and is connected with the movable head or end 41 of a metallic bellows 42, the upper end 43' of the bellows 42 being connected to the cross member 43.

The enlarged portions or heads 37—38 of the rack bars 34—35 carry respectively, spring actuated plunger pins 44 and 44' which project through opening 45 in the front wall of the casing 23 and normally bear against a bracket 46 of non-conductive material. The bracket 46 supports two metal plates 47—47' which act as contacts for the plunger pins 44—44', when the latter are elevated by the action of gears 21—21'. Electrically connected to the contact plates 47—47' and suitably supported in the cover plate or box 48 are two incandescent signal lamps 49—49', the purpose of which will be later described. A pair of dry batteries 50, one terminal each of which is grounded to the frame and the other connected to its respective lamp provide the necessary electric current. These lamps and batteries are suitably supported or mounted in the box 48.

Mounted on the cross member 51 are tanks 52—52' and 53—53', the first two being connected at their lower reduced ends with the front wheel bellows 42 and 30 by means of tubes 54 and 55 respectively, and the latter two tanks 53—53' are connected to the rear wheel bellows 56 and 57 by tubes 58 and 59 respectively. These tanks receive the liquid displaced by their associated bellows, as will be presently described.

Upper and lower spaced brackets 60 and 61 attached to tanks 52' and 53 support the upper and lower ends respectively of four gauge glasses 62, 63, 64 and 65. These gauge glasses communicate at their lower ends by means of small tubes 66, with openings 67 leading to the measuring chambers 68 of the tanks.

Each tank 52, 52', 53 and 53' is divided into an upper gauging chamber 68, and a lower liquid storage chamber 69, by means of a horizontal partition 70, having the central opening 71 therethrough. Seated upon the beveled valve seat 72 surrounding this opening 71 is tubular valve 73, by means of which the liquid in the gauging chamber 68 can be emptied into the storage chamber 69. The lower ends of the tanks are closed by a valve housing member 74 having a plurality of vertically disposed passages or openings 75 communicating at their lower ends with the respective tubes 54, 55, 58 and 59, and at their upper ends communicating with the valve chamber 76. This chamber 76 is closed by a cap 77 and a plug member 78, the latter being centrally bored to seat the lower end of an elongated tube 79 which extends up through the central opening 71 in partition 70 and through the tubular valve 73. Liquid forced into the lower end of the tank passes up through the openings or passages 75 into the valve chamber 76 and thence up through the tubes 79 into the gauging chamber 68, a mushroom shaped deflector 80 preventing the liquid from finding its way downward through the space 81 between the tube 79 and the valve 73. The valve housing member 74 is also provided with a plurality of radial passages 82 leading from the central cavity or opening 83 to the annular chamber 84 in turn communicating with the storage chambers 69. A plate valve 85 normally seats over and closes the upper end of the cavity 83, a plurality of retaining hooks 86 being employed to prevent upward displacement of the valve.

The system is filled with liquid by pouring the liquid into the tanks through filler openings 87, valves 73 having first been elevated to permit the liquid to flow by gravity down through central opening 71, annular chamber or passage 84, radial passages 82 and thence up through cavity or opening 83 and into valve chamber 76. From valve chamber 76, the liquid flows down through the passages 75 and into the respective metallic bellows. It will be understood that the weight of liquid is sufficient to lift the valve 85 from its seat during the filling operation. The tubular valves 73 are manually lifted from their seats by means of a shaft 88, mounted on the tank covers 89. This shaft has fixed thereto a plurality of arms 90 one for each valve 73, which are connected by means of connecting rods 91 to the respective plates 92 in turn suitably secured to the upper ends of the valves 73. By turning the handle 93 of shaft 88 in an appropriate direction, the valves 73 will be lifted from their seats to permit initial filling of the system or for the purpose of emptying the gauging chambers 68, after each operation of the device. A draw off valve 94 enables the operator to initially fill the storage chambers 69 to the proper level, indicated by arrow 95 in Figure 6.

It is a well known law of hydraulics that the velocity of flow of a liquid through a given orifice is proportional to the square root of the pressure or head. It therefore follows that since the element of time is the same in all cases due to the brakes being applied and released simultaneously, the volume of liquid expelled by the bellows through restricted passages 79 is proportional to the square root of the force applied to the bellows. The size or area of the restricted tube or passage 79 is such that when a maximum weight vehicle for which the apparatus is designed, is tested, at maximum allowable speed, the volume of liquid expelled by the bellows will equal the capacity of the bellows at maximum allowable working stroke of the bellows.

Therefore the capacity of the gauging chambers 68 must be such that the volume of liquid expelled by the metallic bellows at its maximum length of working stroke will fill the gauging chamber 68 to a height selected as the gauging point for a vehicle of maximum weight, moving at maximum speed, for testing the brakes.

In order that the operator may visualize the variations of braking effect of the several brakes on a vehicle in terms of percentage rather than actual retarding force of the brake in pounds of force imparted to the movable plates 7, 7a, 7b and 7c, I employ a logarithmic scale in association with gauge glasses 62 to 65 inclusive and in conjunction with properly shaped displacement member 94', attached to and forming part of tubular valve 73.

Because of the fact that in a logarithmic scale linear distance between any minor and major reading is the same irrespective of the value of the readings, providing the percentage of the difference between the minor and major readings are the same, I employ such a scale 96, whereon values from 40 to 1600, corresponding with the force required over a period of time to deliver the volume of liquid to a height corresponding with the gauge graduations.

As will be apparent from the foregoing the purpose of the bullet shaped displacement members 94' is to modify the volume capacity of gauging chambers 68 so that when predetermined quantities of liquid are delivered to the chambers the level of the liquid in the gauge glasses will correspond with logarithmic scale graduations indicating degrees of force and time which bring about the delivery of said predetermined quantities of liquid.

In practice the wheels of the automobile, the brakes of which are to be tested, are driven in the direction of the arrow 98 onto the respective movable plates 7, 7a, 7b and 7c, and the brakes are simultaneously applied to bring the vehicle to a stop. The retarding force exerted by each wheel against its respective movable plate will carry the latter forward. Such movement of the front wheel plates 7b and 7c will impart upward movement to the bars 27—27' through the medium of plunger bars 14—14', bell cranks 18—18', connecting rods 20—20' and bell cranks 25—25', and it follows that such corresponding forward movement of the rear wheel plates 7—7a will cause the bars 100—100' to be elevated by the action of plunger bars 101—101', bell cranks 102—102', connecting rods 103—103' and bell cranks 104—104'. It should here be noted that bar 27 is acted upon by the left front wheel and that bar 27' is acted upon by the right front wheel. Also that bars 100—100' are acted upon by the respective right and left rear wheels.

The thrust imparted to bar 27 by the left front wheel is divided by the gear 21, one half being imparted to rack bar 34 and the other half to rack bar 28. The thrust imparted to bar 27' by the right front wheel is divided by gear 21', one half being imparted to rack bar 28 and the other half to rack bar 35. Therefore, one half the thrust imparted to bars 27 and 27' by left and right front wheels is taken up by the rack bar 28 thence to the free end of bellows 30, causing the latter to contract and force the liquid contained therein upwardly through pipe 55 through passages 75 (tank 52') valve chamber 76, through restricted passage or tube 79 to gauging chamber 68 and thence downward over mushroom shaped deflector 80, through holes 105 in plate 92, to lower portion of gauging chamber 68. When the vehicle comes to a stop the liquid will cease flowing into gauging chamber 68, and will flow from this chamber through tube or passage 67 and tube 66, to the gauge glass 63 until the height of liquid in gauge glass 63 corresponds with height of liquid in gauging chamber 68. The height of liquid in gauge glass 63 in conjunction with logarithmic scale 96 adjacent the gauge glasses will then indicate the combined effect of one half of the braking force developed by the brakes on both front wheels.

If both front wheel brakes are equally effective then the thrust imparted by bar 27 to rock bar 34 through gear 21, thence to teeth of gear 39 will equal the thrust imparted by bar 27' to rack bar 35, through gear 21' thence to teeth of gear 39, and rack bars 34 and 35 will rise together with gear 39, bar 40 and free end 41 of bellows 42. The combined thrust of rack bars 34 and 35 will be applied to the free end of bellows 42 causing the latter to contract and force the liquid contained therein upwardly through pipe 54, through passages 75 (tank 52), valve chamber 76, through restricted passage or tube 79 to gauging chamber 68, and thence downward over mushroom shaped deflector 80, through holes 105 in plate 92 to lower portion of gauging chamber 68. When the vehicle comes to a stop the liquid will cease flowing into gauging chamber 68 and will flow from this chamber through passage 67 and tube 66 to the gauge glass 62 until the height of liquid in gauge glas 62 corresponds with height of liquid in gauging chamber 68.

As rack bar 34 rises it will carry contact pin 44 over contact plate 47 and close an electric circuit causing the left front wheel lamp 49 to be lighted. As rack bar 35 rises it will cause the right front wheel lamp 49' to be lighted by means of its associated contact pin, contact plate and electric circuit, the lighting of both lamps signifying that gauge glass 62 is indicating the braking effect of the left and right front wheel brakes and that they are equally effective. The height of liquid in gauge glass 62 in conjunction with logarithmic scale will then indicate the effect of the braking force developed by either of the two front wheel brakes. Under these conditions the height of liquid in gauge glasses 62 and 63 will be equal and the operator will know that both front wheel brakes are equally effective, it being obvious that if the effect of the braking force of one of the front wheel brakes is equal to one half the combined effect of the braking force of both front wheels the two brakes must be equally effective. If the brake on the left front wheel is more effective than the brake on the right front wheel then the thrust imparted to rack bar 34 will exceed the thrust imparted to rack bar 35 and the counteracting effect of rack bar 34 through the medium of gear 39 will prevent rack bar 35 from rising. Rack bar 34 will then rise and the thrust imparted to bar 40 by gear 39 will be twice the thrust imparted to the teeth of gear 39 by rack bar 34 and equal to the thrust imparted to bar 27 by the left front wheel brake. The thrust imparted to bar 40 will be communicated to free end of bellows 42 causing the latter to contract and force the liquid contained therein into tank 52 as previously described. As rack bar 34 rises it will carry contact pin 44 over contact plate 47 and close an electric circuit causing the left front wheel lamp 49 to be lighted signifying that gauge glass 62 is indicating the braking effect of the left front wheel brake and that it is the more effective brake. Under these conditions the height of liquid in gauge glass 62 in conjunction with logarithmic scale will then indicate the effect induced by the retarding force of the more effective front wheel brake and since the height of liquid in gauge glass 63 indicates the combined effect of one half of the braking force developed by the brakes of both front wheels the height of liquid in gauge glass 62 will be somewhat higher than in gauge glass 63. The linear distance between the readings of gauges 62 and 63 will always be the same irrespective of the value of the readings so long as the percentage of difference is the same thereby relieving the operator of any mental calculation to arrive at the percentage of difference between any two brakes or sets of brakes.

Obviously if the right front wheel brake was more effective than the left front wheel brake then the conditions would be reversed and rack bar 35 would rise and the right front wheel lamp would be lighted signifying that gauge 62 is indicating the braking effect induced by the right front wheel brake and that it is the more effective brake. It is also obvious that the same description of operation and reading of the logarithmic scale applies to bars 100, 100′, gears 107—107′ carried thereby, rack bars 108—108′, and 28′, bar 109, gear 110, bellows 56—57 and tubes 58 and 59 respectively, which are actuated by the retarding effect of the brakes on the two rear wheels.

By comparing the height of liquid in gauges 63 and 64 which indicate respectively one half of the combined effect of the retarding force induced by the front wheel brakes and one half of the combined effect of the retarding force induced by the rear wheel brakes the operator is able to visualize without mental calculation the percentage of difference between retarding force induced by the two sets of brakes. After the gauge readings have been taken the valves 73 are raised by operating handle 93 thereby allowing the liquid to escape from the several gauging chambers and gauge glasses to the storage chambers of their associated tanks 52, 52′, 53 and 53′, and the device is then ready for a succeeding test.

What I claim is:

1. A brake testing device used on vehicle wheels, comprising a pair of movable plates adapted to be overrun and horizontally shifted by the vehicle wheels when the brakes are applied to said wheels while moving over said plates, a pair of gauges, liquid ejecting means communicating with said gauges, forcing a liquid into said gauges, a liquid contained in said ejecting means, differential means connected to said liquid ejecting means, and means operatively connecting said differential means to said plates whereby one-half the thrust of each of said platforms will be communicated to one of said liquid ejecting means and the full thrust of one of said platforms will be communicated to the other of said liquid ejecting means.

2. A brake testing device used on vehicle wheels, comprising two aligned pairs of movable front and rear plates, adapted to be overrun and horizontally shifted by the front and rear wheels of a vehicle, when the brakes are applied to said wheels, while moving over said plates, a pair of gauges for said front plates, a pair of gauges for said rear plates, a separate liquid filled ejecting means for each of said gauges and in communication therewith, shiftable coupling means between said front plates and the corresponding liquid ejecting means, and shiftable coupling means between said rear plates and the corresponding liquid ejecting means, all of said coupling means including means to transmit one half the thrust of each plate of the corresponding pair of plates to one of the corresponding liquid ejecting means and means to transmit the full thrust of that plate to which the vehicle wheel imparts the greatest thrust to the other of the corresponding liquid ejecting means, to indicate the average brake effect of the front wheels as compared with the average brake effect of the rear wheels and the relative brake effect of the two front wheels and relative breaking effect of the two rear wheels.

3. A brake testing device used on vehicle wheels, comprising a pair of movable plates, adapted to be overrun and horizontally shifted by a vehicle wheel when the brakes of the vehicle are applied while moving over said plates, a pair of gauges, a pair of liquid containing ejecting members each of which communicate with one of said gauges, and coupling means between said ejecting members and said movable plates and including co-operating means to transmit half of the thrust of said plates to one of said ejecting members, and individually operated means to transmit the full thrust of either one of said plates to the other of said ejecting members.

4. A brake testing device used on vehicle wheels, comprising a pair of movable plates adapted to be overrun and horizontally shifted by the vehicle wheels when the brakes are applied to said wheels while moving over said plates, a pair of gauges, a pair of liquid ejecting means communicating with said gauges, forcing a liquid into said gauges, a liquid contained in said ejecting means, coupling means co-operating with each of said plates to actuate the liquid ejecting means for one of said gauges by the combined movements of said plates to indicate one half of the retarding effect of both brakes and selective means included in said coupling means to actuate the liquid ejecting means for the other of said gauges to indicate the retarding effect of the more effective brake.

5. A brake testing device used on vehicle wheels, comprising a pair of movable plates adapted to be overrun and horizontally shifted by a vehicle wheel when the brakes of the vehicle are applied while moving over said plates, a pair of gauges, a pair of liquid containing ejecting members, each of which communicate with one of said gauges, coupling means connected to said plates to directly transmit proportional values of half of the thrust of said plates to one of said ejecting members and selective means acted upon by said coupling means and freely shiftable in one direction only to transmit the full horizontal thrust of either one of said plates to the other of said ejecting members.

6. A brake testing device used on vehicle wheels, comprising two pairs of movable plates, one pair for the front and one pair for the rear vehicle wheels, adapted to be overrun and horizontally shifted by a vehicle wheel when the brakes of the vehicle are applied while moving over said plates, two pairs of gauges, two pairs of liquid containing ejecting members, each member being connected with one of said gauges, coupling means between the movable plates of each pair and the ejecting members of each pair, adapted to proportionally transmit to one of said pair of ejecting members one half of the thrust of the corresponding movable plates, said coupling means including selective means to proportionally transmit the full thrust of the plate advanced by the more effective wheel brake, to indicate the retarding effect of the combined front wheels, the combined rear wheels and the more effective brake of the front and rear wheels.

In testimony whereof I affix my signature.

HERMAN CASLER.